US009230034B2

(12) United States Patent
Priestly et al.

(10) Patent No.: US 9,230,034 B2
(45) Date of Patent: Jan. 5, 2016

(54) RELATED PAGE IDENTIFICATION BASED ON PAGE HIERARCHY AND SUBJECT HIERARCHY

(75) Inventors: Michael Priestly, Toronto (CA); Alyson-Kathleen Riley, Grove Heights, MN (US); Wen Ke Xue, Shanghai (CN); Yi Yan Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 13/183,800

(22) Filed: Jul. 15, 2011

(65) Prior Publication Data

US 2013/0019210 A1  Jan. 17, 2013

(51) Int. Cl.
*G06F 3/03* (2006.01)
*G06F 17/30* (2006.01)

(52) U.S. Cl.
CPC .................................. *G06F 17/3089* (2013.01)

(58) Field of Classification Search
CPC ........................................................ G06F 3/00
USPC ......................................... 715/852, 853, 854
See application file for complete search history.

(56) References Cited

U.S. PATENT DOCUMENTS

| 7,676,465 | B2 * | 3/2010 | Poola ..................... 707/999.005 |
| 7,765,236 | B2 | 7/2010 | Zhai et al. |
| 7,801,896 | B2 * | 9/2010 | Szabo ........................... 707/739 |
| 2002/0059210 | A1 * | 5/2002 | Makus et al. ..................... 707/3 |
| 2004/0054627 | A1 * | 3/2004 | Rutledge .......................... 705/50 |
| 2004/0210568 | A1 * | 10/2004 | Makus et al. ..................... 707/3 |
| 2008/0010292 | A1 * | 1/2008 | Poola .............................. 707/10 |
| 2009/0172035 | A1 * | 7/2009 | Lessing et al. ............. 707/104.1 |
| 2009/0177863 | A1 * | 7/2009 | Rehman et al. .................. 712/30 |
| 2009/0254515 | A1 * | 10/2009 | Terheggen et al. ............... 707/2 |
| 2010/0241507 | A1 * | 9/2010 | Quinn et al. ............... 705/14.42 |

OTHER PUBLICATIONS

Schiffman, "Hierarchy in Web Page Similarity Link Analysis"; Carnegie Mellon University & CommerceNet Labs; CommerceNet Labs Technical Report 06-02 May 2006; pp. 1-22.

* cited by examiner

*Primary Examiner* — Amy Ng
*Assistant Examiner* — Meseker Takele
(74) *Attorney, Agent, or Firm* — Cantor Colburn LLP; Edward Choi

(57) ABSTRACT

A method for related page identification based on page hierarchy and subject hierarchy includes receiving, by a computer, an identification of a current page from a user, the current page being located in a first page hierarchy; identifying a subject tag in the current page; locating the identified subject tag in a subject hierarchy; identifying a related page that is related to the current page based on the subject hierarchy, the related page being located in a second page hierarchy; determining a scope of the related page with respect to the current page based on the first page hierarchy and the second page hierarchy by the computer; navigating the second page hierarchy to determine a suggested page for the user, the suggested page having a desired scope with respect to the current page; and suggesting the suggested page to the user.

12 Claims, 4 Drawing Sheets

| 300 | SAME SUBJECT, SAME LEVEL 301A | SIBLING SUBJECT, SAME LEVEL 301B | HIGHER-LEVEL SUBJECT 301C | LOWER-LEVEL SUBJECT 301D |
|---|---|---|---|---|
| SAME SCOPE 302 | SHOW PAGES WITH SAME SUBJECT AND SCOPE 302A | SHOW PAGES WITH ALT. SUBJECT AT SAME SUBJECT LEVEL AND SAME SCOPE 302B | SHOW PAGES WITH HIGHER-LEVEL SUBJECT AT SAME SCOPE LEVEL 302C | SHOW PAGES WITH LOWER LEVEL SUBJECT AT SAME SCOPE 302D |
| SAME SCOPE; PREVIOUS SIBLING 303 | SHOW PAGES WITH SAME SUBJECT AND PREVIOUS SIBLING SCOPE 303A | SHOW PAGES FOR ALT. SUBJECT AT SAME SUBJECT LEVEL AND PREVIOUS SIBLING SCOPE 303B | SHOW PAGES WITH HIGHER LEVEL SUBJECT AND PREVIOUS SIBLING SCOPE LEVEL 303C | SHOW PAGES FOR LOWER LEVEL SUBJECT AND PREVIOUS SIBLING SCOPE 303D |
| SAME SCOPE; NEXT SIBLING 304 | SHOW PAGES WITH SAME SUBJECT AND NEXT SIBLING SCOPE 304A | SHOW PAGES FOR ALT. SUBJECT AT SAME SUBJECT LEVEL AND NEXT SIBLING SCOPE 304B | SHOW PAGES WITH HIGHER LEVEL SUBJECT AND NEXT SIBLING SCOPE LEVEL 304C | SHOW PAGES FOR LOWER LEVEL SUBJECT AND NEXT SIBLING SCOPE 304D |
| HIGHER SCOPE PAGE 305 | SHOW HIGHER SCOPE PAGES FOR SAME SUBJECT 305A | SHOW HIGHER SCOPE PAGES FOR ALT. SUBJECT AT SAME SUBJECT LEVEL 305B | SHOW HIGHER SCOPE LEVEL PAGES FOR HIGHER LEVEL SUBJECT 305C | SHOW HIGHER SCOPE PAGES FOR LOWER LEVEL SUBJECT 305D |
| LOWER SCOPE PAGE 306 | SHOW LOWER SCOPE PAGES FOR SAME SUBJECT 306A | SHOW LOWER SCOPE PAGES FOR ALT. SUBJECT AT SAME SUBJECT LEVEL 306B | SHOW LOWER SCOPE PAGES FOR HIGHER LEVEL SUBJECT 306C | SHOW LOWER SCOPE PAGES FOR LOWER LEVEL SUBJECT 306D |

FIG. 3

RELATED PAGE IDENTIFICATION BASED ON PAGE HIERARCHY AND SUBJECT HIERARCHY

BACKGROUND

This disclosure relates generally to the field of computer networks, and more specifically to searching for information in computer networks.

Users may locate information pertaining to a particular subject by searching a network (which may be the Internet or an intranet) of web pages (or pages) that are stored on one or more computers in the network for specific keywords. The keyword search returns search results, including a set of pages that contain the keywords. The user may then browse the pages in the search results to determine a particular relevant page that contains the information desired by the user. Once a relevant page is identified, the user may desire more detailed information on the searched subject, or a broader overview that can give context for the information in the relevant page. However, going back to the search results may not accomplish this goal, since search results do not include awareness of the scope of other pages returned in the search results, especially relative to a particular page the user is currently considering.

Web pages may be organized into a hierarchy to give information regarding the relationships between pages included in the hierarchy. A hierarchy may define relationships between pages from a single domain, or may cross multiple domains. Some solutions for relating pages in a hierarchy, such as parent links, Resource Description Framework (RDF), Darwin Information Typing Architecture (DITA) maps, or breadcrumb links, may limit relationships to those predefined by the author of the hierarchy. In cases where a search returns results from multiple different hierarchies, hierarchical relationships between pages in the different hierarchies may not be available. The content in a page may be tagged with, for example, a content type or a subject type that identifies the information in the page as an overview (either an overview page, for content typing, or an overview of a particular subject, for subject tagging), but this does not allow for arbitrary levels of hierarchy, in which one person's overview may be another person's details, depending on the scope of their search, and requires specialized tagging by an author or classifier.

BRIEF SUMMARY

In one aspect, a method for related page identification based on page hierarchy and subject hierarchy includes receiving an identification of a current page from a user by a computer, the current page being located in a first page hierarchy; identifying a subject tag in the current page; locating the identified subject tag in a subject hierarchy by the computer; identifying a related page that is related to the current page based on the subject hierarchy, the related page being located in a second page hierarchy, by the computer; determining a scope of the related page with respect to the current page based on the first page hierarchy and the second page hierarchy by the computer; navigating the second page hierarchy to determine a suggested page for the user, the suggested page having a desired scope with respect to the current page, by the computer; and suggesting the suggested page to the user by the computer.

In another aspect, a computer program product comprising a computer readable storage medium containing computer code that, when executed by a computer, implements a method for related page identification based on page hierarchy and subject hierarchy, wherein the method includes receiving an identification of a current page from a user, the current page being located in a first page hierarchy; identifying a subject tag in the current page; locating the identified subject tag in a subject hierarchy; identifying a related page that is related to the current page based on the subject hierarchy, the related page being located in a second page hierarchy; determining a scope of the related page with respect to the current page based on the first page hierarchy and the second page hierarchy; navigating the second page hierarchy to determine a suggested page for the user, the suggested page having a desired scope with respect to the current page; and suggesting the suggested page to the user by the computer.

In another aspect, a computing system for related page identification based on page hierarchy and subject hierarchy includes a processor configured to receive an identification of a current page from a user, the current page being located in a first page hierarchy; identify a subject tag in the current page; locate the identified subject tag in a subject hierarchy; identify a related page that is related to the current page based on the subject hierarchy, the related page being located in a second page hierarchy; determine a scope of the related page with respect to the current page based on the first page hierarchy and the second page hierarchy; navigate the second page hierarchy to determine a suggested page for the user, the suggested page having a desired scope with respect to the current page; and suggest the suggested page to the user.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 3 illustrates a table showing relationships between pages that may be identified using the method of FIG. 2.

DETAILED DESCRIPTION

Figure 1:
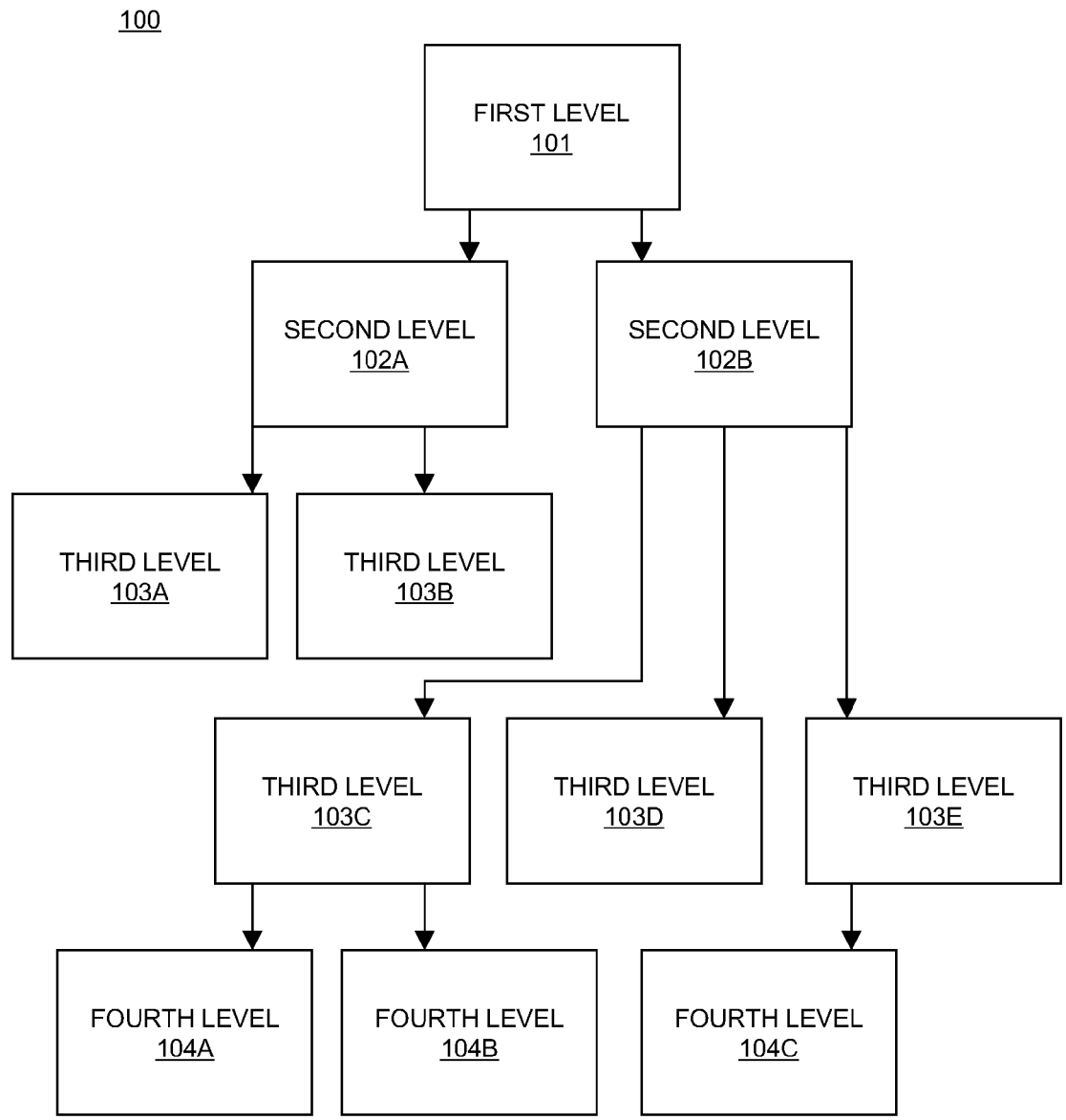
FIG. 1 illustrates an example of a hierarchy.

Embodiments of systems and methods for related page identification based on page hierarchy and subject hierarchy are provided, with exemplary embodiments being discussed below in detail. Page and subject hierarchies may be used in conjunction with one another to suggest related pages to a user who is performing a search. A user may traverse a subject hierarchy to find relevant pages that may not contain the particular search terms that were used to find a particular page, and may also traverse a page hierarchy in which the current page, or a related page as determined from the subject hierarchy, is located to find information of greater or lesser scope. A subject hierarchy may be used to identify related pages that are located in a different page hierarchy than the current page, allowing a search to span multiple page hierarchies.

A page hierarchy gives structural relationships between pages regarding scope. Each level in a page hierarchy indicates an increment of scope, and each node in a page hierarchy may map to a single page. For example, referring to the example hierarchy in FIG. 1, the first level node 101 may be equated to a book, the second level nodes 102A-B be equated to sections in the book, the third level nodes 103A-E may be a equated to chapters in the sections, and the fourth level nodes 104A-C may be equated to subsections of the chapters. Nodes on the same level are referred to as siblings, i.e., second level nodes 102A-B are siblings, third level nodes 103A-E are siblings, and fourth level nodes 104A-C are siblings. Sibling nodes in a page hierarchy may be ordered; for example, in the third level of hierarchy 100, the third level node 103D may be defined as having a previous sibling node 103C, and a next sibling node 103E. The next/previous sibling relationships may indicate a reading sequence. A page hierarchy may include any appropriate number of levels and nodes, and may include pages from a single domain or multiple domains. A page hierarchy is limited to relationships between a specific set of pages, and may be directly authored by, for example, an administrator of a particular domain to define relationships between the pages in the domain.

The scope of a page may be determined based on the number of levels located below the page in a page hierarchy that contains the page. A top-level page in a smaller page hierarchy may be narrower in scope than a lower-level page in a larger page hierarchy. More pages may be organized underneath the lower-level page in the larger page hierarchy, indicating a broader scope for the lower-level page in the larger page hierarchy. The number of levels that are counted as being below a particular page may be direct descendents of the particular page, or may be descendents of pages that are siblings of the particular page. Referring back to FIG. 1, second-level sibling nodes 102A-B have the same scope in the page hierarchy 100, even though second level node 102A has descendants in only one level (third level nodes 103A-B), and second level node 102B has descendants in two levels (third level nodes 103C-E, and fourth level nodes 104A-C). Second level nodes 102A-B both have two levels below them in page hierarchy 100. Therefore, to find pages with a broader, or higher, scope than a current page, pages in other page hierarchies or other pages in the same page hierarchy with similar subjects and more levels underneath them may be examined. To find pages with a narrower, or lower, scope than a current page, other pages with similar subjects and fewer levels underneath them in the other page's respective page hierarchies may be examined.

Determination of pages having similar subjects may be performed using subject tags and a subject hierarchy. A subject hierarchy gives relationships between subjects. Referring again to the example hierarchy of FIG. 1, for an example subject hierarchy that classifies animals, the first level node 101 may be "animals", the second level nodes 102A-B may be "birds" and "mammals", the third level nodes 103A-E nodes may be specific types of birds (e.g., "chicken" or "ostrich") or mammals (e.g., "dog" or "cat"), and the fourth level nodes 104A-C may be subtypes of the specific types (e.g., breeds such as "persian" or "terrier"). Nodes having the same level are referred to as siblings, i.e., second level nodes 102A-B are siblings, third level nodes 104A-C are siblings, and fourth level nodes 104A-C are siblings. A subject hierarchy may contain any appropriate number of levels, and the various levels may include any appropriate number of nodes.

Any number of pages containing a particular subject tag may be associated with the same node in a subject hierarchy. Pages having the same subject, a sibling subject, or a broader or narrower subject, may be identified by navigating the subject hierarchy. Any page from any domain that contains subject tags may be placed into a subject hierarchy based on the subject tags located in the page. The subject tags may be added to pages by, for example, an administrator.

Use of subject hierarchies allows more than simple word matching to be used to find similar pages. A page that does not contain particular search terms may be related to a page that does contain the search terms if their subjects are related. Therefore, a user may use the subject tags in a current page that is part of search results returned by a keyword search to find similar pages to the current page using the subject hierarchy. The similar pages identified via the subject hierarchy may then be used to find pages of broader or narrower scope that are organized in a different page hierarchy from the current page. The user may choose a subject navigation direction (broader or narrower to move up or down subject levels, or to another sibling in the same subject level) along with page navigation direction (broader or narrower to move up or down in scope, or previous or next siblings in the same scope) as two axes along which to browse for more content based on a current page.

The combination of subject hierarchy and page hierarchy browsing allows an increased range of page browsing activities, enabling users to retrieve and learn new information in ways that are not possible with keyword searching, page hierarchy browsing, or subject hierarchy browsing on their own. When a user finds a page that is almost but not quite what they are looking for, the user may select which aspects of their current page they wish to preserve or modify to identify similar pages that can provide a better fit to their information needs. Also, as a user moves between pages (by, for example, navigating the page hierarchy, following related links, selecting new subjects or returning to search results), the relationship between a newly identified page's hierarchy level and subject level and a previously identified page's hierarchy level and subject level is preserved. If a page does not belong to a page hierarchy, a set of pages that the page belongs to may be organized into a page hierarchy by choosing a subject hierarchy by which to organize the set of pages. The chosen subject hierarchy is thereby transformed into a page hierarchy because it is limited to a specific set of pages, instead of being a hierarchy of a set of subject tags.

Figure 2:
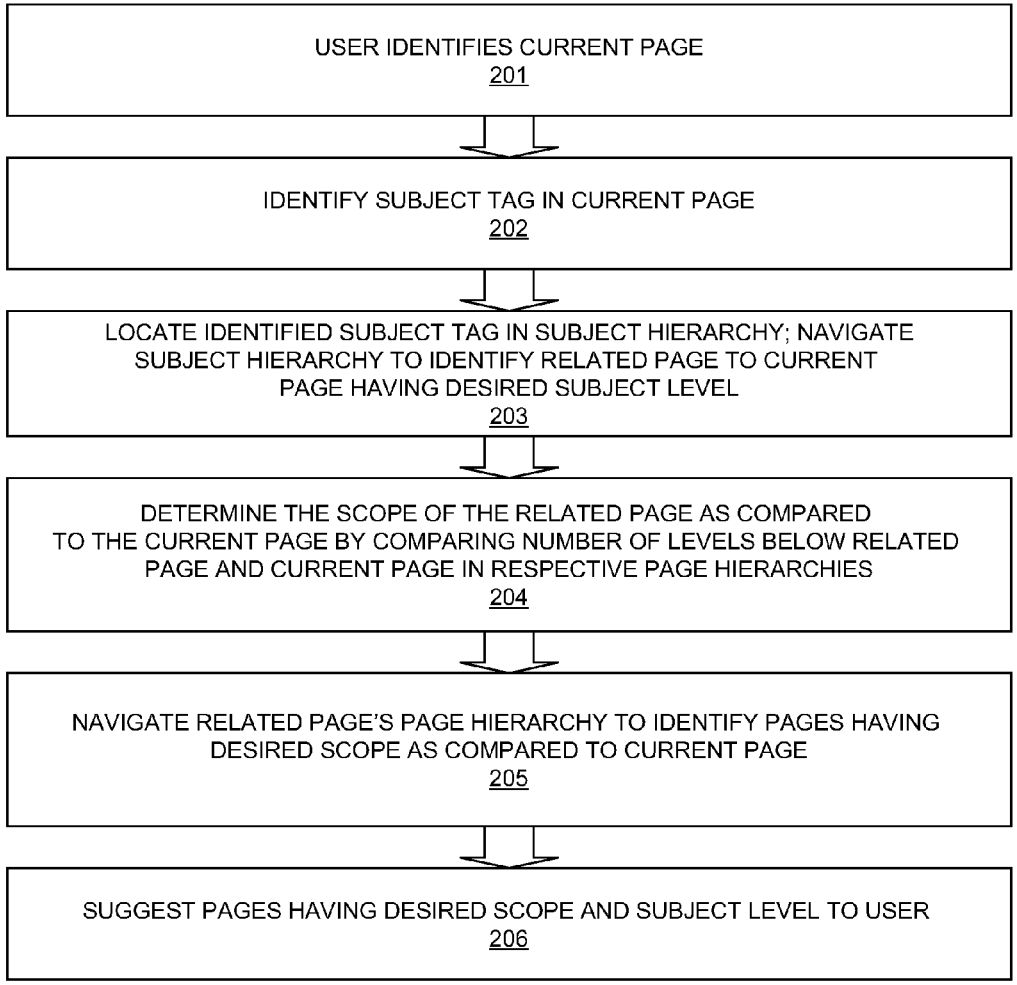
FIG. 2 is a flowchart illustrating an embodiment of a method for related page identification based on page hierarchy and subject hierarchy.

FIG. 2 is a flowchart illustrating an embodiment of a method 200 for related page identification based on page hierarchy and subject hierarchy. First, in block 201, a user identifies a current page of interest from, for example, a set of search results returned by keyword searching. In block 202, a subject tag in the current page is identified. The subject tag may be identified automatically, or selected by the user from a set of subject tags in the current page. In block 203, the identified subject tag is located in a subject hierarchy, and the subject hierarchy is navigated to identify other pages having the same, broader or narrower subject level, as desired by the user. When the node having the desired subject level is located in the subject hierarchy, pages having the subject tag indicated by the node having the desired subject level are identified as related pages. In block 204, it is determined whether a related page identified in block 203 is broader or narrower in scope than the current page by comparing the number of levels below the current page (identified in block 201) in its respective page hierarchy with the number of levels below the related page (identified in block 203) in its respective page hierarchy. The current page and the related page may be part of the same page hierarchy or may be part of different page hierarchies in various embodiments. Then, in block 205, a related page's respective page hierarchy is navigated as necessary to locate pages having the scope desired by the user as compared to the current page. Then, in block 206, one or more pages having the subject level and scope desired by the user (broader, narrower, sibling, or same subject as compared to the current page, and broader, narrower, previous or next sibling, or same scope as compared to the current page) are suggested to the user. A user may be shown the results in a suggested content widget, and may be provided with various methods to choose between alternatives, including sliders, tag clouds, or a virtual map of the subject and page hierarchies with zoom in/zoom out options. The user may also locate more results by repeating blocks 202-206 by using one of the pages suggested in block 206 as the current page. In some embodiments, multiple subject tags from the current page may be identified in block 202, and multiple subject hierarchies may be navigated in block 203. Further, multiple page hierarchies may be navigated in block 204, depending on the number of related pages with respective page hierarchies that are determined from the subject hierarchy navigation in block 203.

To illustrate application of the method 200 of FIG. 1, a user may identify an expert-level page on administration of a DB2 database as the current page in block 201, from, for example, a set of search results returned by a keyword search. The user may desire a beginner-level page on general database administration, which has a higher-level subject (general database administration, versus DB2 administration) and a higher-level scope (introductory versus detailed) as compared to the current page. In block 202, the subject tag "DB2" in the expert-level page on administration of a DB2 database is identified. In block 203, a subject hierarchy with a node labeled "DB2" is identified, and the subject hierarchy is navigated up to identify one or more pages that have higher-level subjects than the current page to arrive at a desired subject. In this example, the subject tag "database" may have the desired subject level, so pages that have the subject tag "database" would be identified as related pages. The one or more related pages may be part of various different respective page hierarchies. In block 204, the scopes of the related pages versus the current page are determined based on the number of levels located underneath the related pages versus the current page in their respective page hierarchies. In block 205, the page hierarchies containing the related pages are navigated up or down to locate pages having the desired scope as compared to the current page. Because a higher-level scope (i.e., introductory versus detailed) is desired, pages that have more levels located underneath them in their respective page hierarchy as compared to the current page are identified. In block 206, the pages having the desired subject level and scope are suggested to the user. The user may navigate the page and subject hierarchies by, for example, scrolling, in some embodiments, or the hierarchy navigation may be performed automatically in other embodiments.

FIG. 3 shows a table that gives a listing of available browsing options using the subject and page hierarchy navigation method 200 of FIG. 2 for the case of a single subject hierarchy. Blocks 301A-D on the top row give options for subject hierarchy browsing, and blocks 302, 303, 304, 305, and 406 in the left column give options for page hierarchy browsing. The user may select any subject level and scope with respect to the current page. For example, if a user desires a page having a higher-level subject (301C) and a lower scope (306), a page as described in block 306C, having a lower scope and a higher subject level, will be returned. The scope of the returned page versus the current page is determined by the number of levels located below the returned page versus the current page in their respective page hierarchies; the returned page has a lower scope if it has fewer levels located below it in its page hierarchy than the current page has below it in its page hierarchy.

Figure 4:
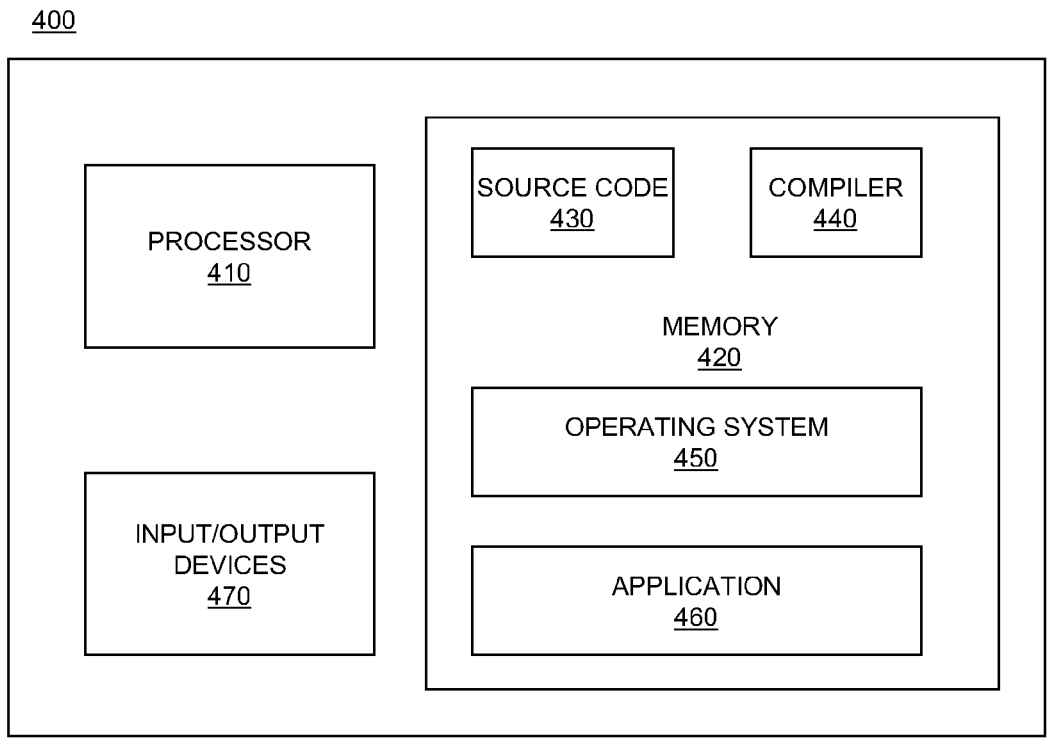
FIG. 4 is a schematic block diagram illustrating an embodiment of a computer that may be used in conjunction with a method for related page identification based on page hierarchy and subject hierarchy.

FIG. 4 illustrates an example of a computer 400 which may be utilized by exemplary embodiments of a method for related page identification based on page hierarchy and subject hierarchy as embodied in software. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments identification of search results having desired a subject level and scope across different page hierarchies.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for related page identification based on page hierarchy and subject hierarchy, the method comprising:
   receiving, by a computer, an identification of a current page from a user, the current page being located in a first page hierarchy;
   receiving a desired subject level from the user;
   receiving a desired scope from the user;
   identifying a first subject tag in the current page;

locating the first subject tag in a subject hierarchy comprising a plurality of subjects corresponding to subject tags that are organized based on relationships between the subjects in the subject hierarchy by the computer;

navigating the subject hierarchy starting from the first subject tag based on the desired subject level to identify a second subject tag in the subject hierarchy having the desired subject level with respect to the current page;

identifying a related page that contains the second subject tag and that is related to the current page based on the subject hierarchy, the related page being located in a second page hierarchy, the first page hierarchy being different from the second page hierarchy, by the computer;

determining a scope of the related page with respect to the current page based on the first page hierarchy and the second page hierarchy by the computer by:

determining a number of levels located directly below the current page in the first page hierarchy;

determining a number of levels located directly below the related page in the second page hierarchy;

comparing the number of levels located directly below the current page in the first page hierarchy to the number of levels located directly below the related page in the second page hierarchy;

in the event the number of levels below the current page is greater than the number of levels below the related page, determining that the related page has a lower scope than the current page;

in the event the number of levels below the current page is less than the number of levels below the related page, determining that the related page has a higher scope than the current page; and in the event the number of levels below the current page is the same as the number of levels below the related page, determining that the related page has the same scope as the current page;

navigating the second page hierarchy starting at the related page to determine a suggested page for the user based on the scope of the related page with respect to the current page, the suggested page having the desired scope with respect to the current page, by the computer; and suggesting the suggested page to the user by the computer.

2. The method of claim 1, wherein the current page is selected by the user from a set of search results returned by a keyword search.

3. The method of claim 1, wherein the user identifies the first subject tag in the current page, and the computer receives the identification from the user.

4. The method of claim 1, wherein the computer automatically identifies the first subject tag in the current page.

5. The method of claim 1, wherein the desired subject level with respect to the current page is one of higher, lower, the same, and sibling.

6. The method of claim 5, wherein in the event the desired subject level is higher, the second subject tag is located above the first subject tag in the subject hierarchy;

in the event the desired subject level is lower, the second subject tag is located below the first subject tag in the subject hierarchy;

in the event the desired subject level is the same, the second subject tag is the same as the first subject tag; and in the event the desired subject level is sibling, the second subject tag is located in a same level as the first subject tag in the subject hierarchy.

7. The method of claim 1, wherein the desired scope with respect to the current page is one of higher, lower, the same, previous sibling, and next sibling.

8. The method of claim 7, wherein in the event the desired scope is the same, the related page is determined to be the suggested page.

9. The method of claim 7, wherein in the event the desired scope is the previous sibling, a page that is located on the same level as the related page and before the related page in a reading order is determined to be the suggested page.

10. The method of claim 7, wherein in the event the desired scope is the next sibling, a page that is located on the same level as the related page and after the related page in a reading order is determined to be the suggested page.

11. A non-transitory computer program product comprising a computer readable storage medium containing computer code that, when executed by a computer, implements a method for related page identification based on page hierarchy and subject hierarchy, wherein the method comprises:

receiving, by a computer, an identification of a current page from a user, the current page being located in a first page hierarchy;

receiving a desired subject level from the user; receiving a desired scope from the user; identifying a first subject tag in the current page;

locating the first subject tag in a subject hierarchy comprising a plurality of subjects corresponding to subject tags that are organized based on relationships between the subjects in the subject hierarchy;

navigating the subject hierarchy starting from the first subject tag based on the desired subject level to identify a second subject tag in the subject hierarchy having the desired subject level with respect to the current page;

identifying a related page that contains the second subject tag and that is related to the current page based on the subject hierarchy, the related page being located in a second page hierarchy, the first page hierarchy being different from the second page hierarchy;

determining a scope of the related page with respect to the current page based on the first page hierarchy and the second page hierarchy by:

determining a number of levels located directly below the current page in the first page hierarchy;

determining a number of levels located directly below the related page in the second page hierarchy;

comparing the number of levels located directly below the current page in the first page hierarchy to the number of levels located directly below the related page in the second page hierarchy;

in the event the number of levels below the current page is greater than the number of levels below the related page, determining that the related page has a lower scope than the current page;

in the event the number of levels below the current page is less than the number of levels below the related page, determining that the related page has a higher scope than the current page; and in the event the number of levels below the current page is the same as the number of levels below the related page, determining that the related page has the same scope as the current page;

navigating the second page hierarchy starting at the related page to determine a suggested page for the user based on the scope of the related page with respect to the current page, the suggested page having a the desired scope with respect to the current page; and suggesting the suggested page to the user by the computer.

12. A computing system for related page identification based on page hierarchy and subject hierarchy, the computing system comprising:
a processor and a memory configured to:
receive an identification of a current page from a user, the current page being located in a first page hierarchy;
receive a desired subject level from the user;
receive a desired scope from the user;
identify a first subject tag in the current page;
locate the first subject tag in a subject hierarchy comprising a plurality of subjects corresponding to subject tags that are organized based on relationships between the subjects in the subject hierarchy;
navigate the subject hierarchy starting from the first subject tag based on the desired subject level to identify a second subject tag in the subject hierarchy having the desired subject level with respect to the current page;
identify a related page that contains the second subject tag and that is related to the current page based on the subject hierarchy, the related page being located in a second page hierarchy, the first page hierarchy being different from the second page hierarchy;
determine a scope of the related page with respect to the current page based on the first page hierarchy and the second page hierarchy by:
determining a number of levels located directly below the current page in the first page hierarchy;
determining a number of levels located directly below the related page in the second page hierarchy;
comparing the number of levels located directly below the current page in the first page hierarchy to the number of levels located directly below the related page in the second page hierarchy;
in the event the number of levels below the current page is greater than the number of levels below the related page, determining that the related page has a lower scope than the current page;
in the event the number of levels below the current page is less than the number of levels below the related page, determining that the related page has a higher scope than the current page; and
in the event the number of levels below the current page is the same as the number of levels below the related page, determining that the related page has the same scope as the current page;
navigate the second page hierarchy starting at the related page to determine a suggested page for the user based on the scope of the related page with respect to the current page, the suggested page having the desired scope with respect to the current page; and
suggest the suggested page to the user by the computing system.

* * * * *